United States Patent [19]

Herz

[11] 3,839,861
[45] Oct. 8, 1974

[54] SOLID PROPELLANT POWERED ROCKET MOTOR CONTROL SYSTEM

[75] Inventor: Richard George Herz, Salt Lake City, Utah

[73] Assignee: Hercules Incorporated, Wilmington, Del.

[22] Filed: Sept. 25, 1972

[21] Appl. No.: 292,191

[52] U.S. Cl............... 60/234, 60/254, 102/49.8
[51] Int. Cl............................................. F02k 9/04
[58] Field of Search............... 60/234, 253–256, 60/223, 251; 102/49.3, 49.8; 73/116, 117.2–117.4

[56] References Cited
UNITED STATES PATENTS

| | | | |
|---|---|---|---|
| 3,201,973 | 8/1965 | Fitzgerald et al................. | 102/49.3 |
| 3,392,524 | 7/1968 | Caveny................................ | 60/254 |
| 3,656,304 | 4/1972 | McCullough...................... | 102/49.8 |

FOREIGN PATENTS OR APPLICATIONS

| | | | |
|---|---|---|---|
| 723,040 | 2/1955 | Great Britain........................ | 60/254 |

Primary Examiner—Carlton R. Croyle
Assistant Examiner—Robert E. Garrett
Attorney, Agent, or Firm—James W. Peterson

[57] ABSTRACT

The invention is a control system for a solid propellant powered rocket motor, said system utilizing an electrical impulse generating sensor means responsive to heat generated by the burning propellant.

6 Claims, 8 Drawing Figures

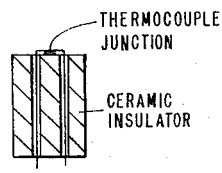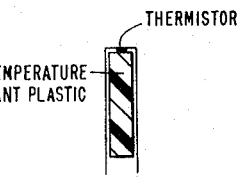
FIG. 1  FIG. 2
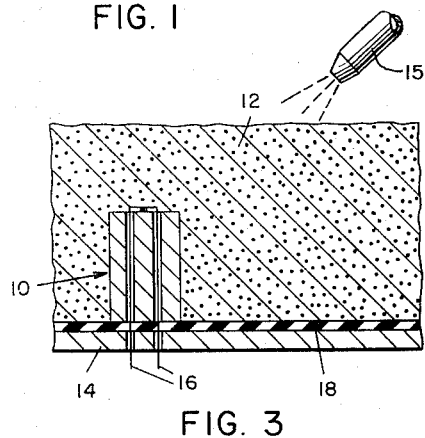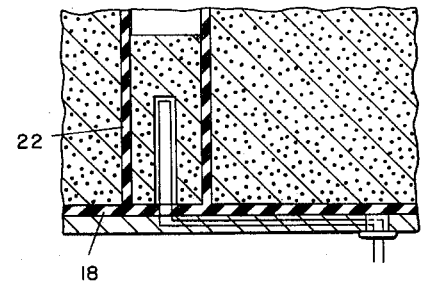
FIG. 3  FIG. 4
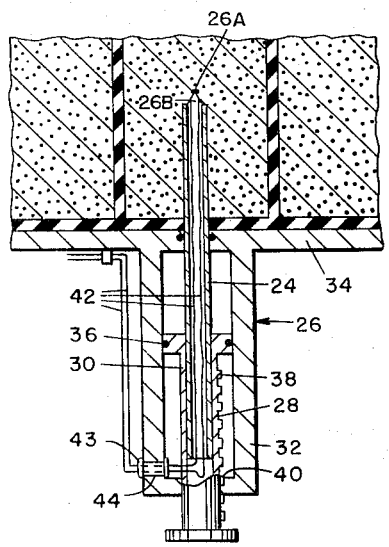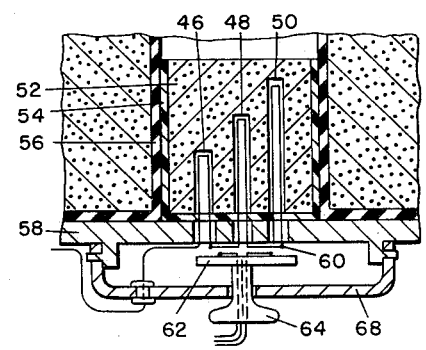
FIG. 5  FIG. 6
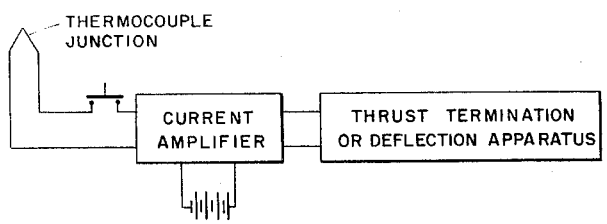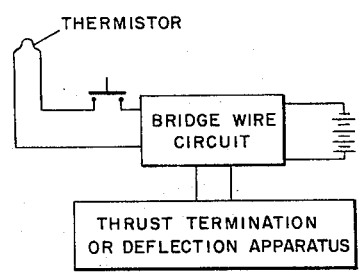
FIG. 7  FIG. 8

SOLID PROPELLANT POWERED ROCKET MOTOR CONTROL SYSTEM

This invention relates to a control system for a solid propellant powered rocket motor. More particularly, this invention relates to a control system that can control thrust or alter the flight of a rocket motor based upon sensing of the propellant burning front at a particular point in the propellant and transmitting a signal to a thrust control device in response to the sensing of the burning front of the propellant.

In the expanding applications of solid propellant rockets to meet the demands of sophisticated mission requirements deemed necessary of future space and defensive ballistic rocket systems, the need for providing precise control of impulse energy and auxiliary control systems is quite important. Many techniques and systems have been devised for terminating combustion, reversing thrust or changing the course of a rocket. However, few simple, low-cost techniques are available for sensing the energy level of a rocket motor and for providing a signal at a precise moment to effect control or actuation of a thrust control system.

Most impulse sensing techniques are based upon the principle of either measuring motor combustion pressure, rocket acceleration, or operating time, which are dependent upon sub-systems having sophisticated components, electronic circuits or computing systems. Such systems are costly, and have reliability, storage and operational problems resulting, in part, from the wide temperature extremes and environmental conditions in which such systems must operate.

Accordingly, it is an object of this invention to provide a simple control system for a solid propellant powered rocket motor for controlling thrust or altering the flight of the rocket motor.

Other objects of this invention, will, in part, be obvious and will, in part, appear hereinafter. For a complete understanding of the nature and objects of this invention, reference is made to the following detailed description and drawings.

In accordance with this invention a control system is provided for solid propellant powered rocket motors comprising; (a) a burning distance probe sensor comprising a sensing element capable of generating an electrical impulse in response to sensing of heat generated by the burning propellant of the rocket motor and a probe, said sensing element being secured to said probe, said probe being positioned in the rocket motor and surrounded by propellant; (b) lead wires connected to said sensing element for transmitting of an electrical signal therefrom; and, (c) circuit means connected to said lead wires, for actuating; (d) control system to control rocket motor flight in response to transmission of an electrical impulse from the burning distance probe sensor through the lead wires into said circuit means.

The thrust control system of this invention is based simply upon the principle of correlating motor performance based upon known solid propellant rocket motor ballistics with the predetermined conditions at which it is desired to control thrust. Specifically, the percentage of propellant consumed in operation of the rocket motor is correlated to time, energy level or flight characteristic through known ballistic characteristics of the rocket motor. For example, the total impulse energy $I_T$ of a rocket motor can be expressed as the product of (a) the weight of propellant consumed, $W_p$ and (b) the specific impulse energy of the propellant, $I_{sp}$ in accordance with the following equation ($I_T = W_p I_{sp}$). By correlating the weight of propellant consumed, $W_p$, to the web distance burned, $W_b$, a desired impulse energy level for the rocket motor can be programmed before flight by locating a sensing element in the propellant at the web distance commensurate with the desired impulse increment.

Web distance is the thickness of propellant measured normal to the burning surface. Therefore, $W_p$ may be correlated to $W_b$ as follows:

$$W_p = W_b \times S_{ave} \times \rho_P$$

where $S_{ave}$ is the average burning surface through $W_b$, and $\rho_P$ is the density of the propellant. Thus, by embedding a sensing element within a propellant web at a web distance commensurate with the weight of propellant required to provide the desired impulse, a simple means of providing signals for the activation of a thrust control system is provided without costly, sophisticated equipment.

Multiple sensing elements and a switch to provide selection between the various sensing elements embedded at various lengths in the propellant can also be employed. A selector switch or safe arm switch is employed in the system to connect a selected sensing element to a thrust control device for operation at a predetermined time after firing of the rocket motor.

The thrust motor system of this invention is more fully illustrated in the drawings which follow. In the drawings, like numbers refer to like parts where applicable.

FIG. 1 is a schematic view of a burning distance probe sensor in which a thermocouple is employed as the sensing element.

FIG. 2 is a schematic view of a burning distance probe sensor in which a thermistor is employed as the sensing element.

FIG. 3 is a partial cross-sectional view of a burning distance probe sensor embedded in solid propellant of a solid propellant powered rocket motor.

FIG. 4 is a partial cross-sectional view of a burning distance probe sensor installed in a cylinder of propellant which has been cured and trimmed outside the rocket motor case, then inserted over the probe and secured to the sleeve of insulation.

FIG. 5 is a partial cross-sectional view of a burning distance probe sensor in which the burning distance probe sensor can be moved into viscoelastic solid propellants without causing a void to form above the probe.

FIG. 6 is a partial cross-sectional view of multiple burning distance probe sensors employed in combination with a switch.

FIGS. 7 and 8 are schematic illustrations of simple circuits which can be employed in combination with a thermocouple or thermistor.

In FIG. 1 a sensing element consisting of a thermocouple is illustrated with lead wires passing through holes provided in a ceramic insulator probe.

In FIG. 2 a thermistor is secured to the forward end of a high temperature resistant plastic probe. The probe can be prepared from a material such as a fluorocarbon or phenolic or silicone modified plastic. The probes illustrated in FIGS. 1 and 2 are prepared in the lengths necessary so that the sensing elements secured thereto can be embedded in the solid propellant charge at the desired depth in the propellant web.

In FIG. 3 a burning distance probe sensor 10 is shown embedded in propellant 12 within a rocket motor case 14. The lead wires 16 are secured to the probe sensor sensing element and pass through insulator 18 and rocket motor case 14 to the exterior surface 20 of the rocket motor case 14. These lead wires are then connected to a suitable circuit means (not shown) for actuating a control system.

In FIG. 4 a modified embodiment of the burning distance probe sensor of FIG. 3 is shown. In this embodiment a cylindrical insulator 22 is bonded to the rocket motor case insulator 18.

The purpose of the insulator is to permit the insertion and adhesive bonding of a plug of cured propellant, which has been trimmed to length, into the sleeve of insulation anytime after the rocket propellant grain has been manufactured. The advantage to this design is that the web distance selected for thrust sensing does not have to be selected either by fixing the length of the probe before grain manufacture, or by trimming propellant inside the rocket motor case to the desired thickness above the probe as required by the design of FIG. 3. The burning distance probe sensor is adhesively bonded to insulator 18 to exclude voids and is centrally positioned within insulator sleeve 22.

In FIG. 5 a burning distance sensing probe having means to vary the distance of the probe into the propellant is shown.

This burning distance sensing probe 26 comprises a thermistor or thermocouple 26A placed at the top of the pointed solid rod 26B having longitudinal grooves for lead wires 42 said rod being made of high temperature resistant plastic such as phenolic or polyester and over which is placed a cylinder 24 of the same plastic with adhesive such as epoxy cement to embed the leads 42 in the bonded plastic parts 24 and leave the thermistor or thermocouple exposed to the flame front at the point. The base end 28 of the probe assembly 24 is secured within a longitudinal cavity in plunger 30. Plunger 30 is mounted for manual movement within cylindrical mounting bracket 32. Mounting bracket 32 is secured to the exterior surface of rocket motor case 34. Plunger 30 has a piston 36 containing an "O" ring seal at its forward end for effecting a seal between the piston and interior surface of the cylindrical mounting bracket and shaft 38 secured to piston 36 and extending to the exterior of mounting bracket 32. Plunger shaft 38 has a series of detent pins secured along an exterior axis of the shaft 38 which can be locked into position in a groove plane (not shown) in the face 40 of mounting bracket 32. Lead wires 42 pass from the sensing element of the probe sensor 26 through tube 24 and through a rubber insulator 43 secured in an opening 44 in mounting bracket 32 to the circuit means for actuating a control device.

The probe sensor is extended into the propellant by turning the plunger shaft 38 to unlock the detent, applying pressure so that the pointed tip may compress or shear the viscoelastic binder of solid propellants in which the crack will not propagate, and turning the plunger shaft to lock the probe when it has penetrated to the desired distance from the initial burning surface.

In FIG. 6 another embodiment of a probe sensor which can be employed in the control system for a solid propellant rocket motor of this invention is illustrated. In this embodiment three probe sensors 46, 48, 50 are positioned at various web depths within a cylinder of propellant 52 cast into a phenolic cup 54 and bonded to a rubber insulated cylindrical cavity 56. Lead wires from each of the three probe sensors pass through the rocket case 58. One lead wire from each sensor probe is connected to a common lead, which is in turn connected to the control circuit. One lead from each sensor probe is connected to a contact of a switch plate 60. Switch 62 has contacts corresponding to the contacts from the three sensor probes. Indicator knob 64 of switch 62 is rotated within housing 68 for selection of the probe sensor which is to be made active for a particular mission. As can be readily appreciated, the sensing switch can be made so that all three probe sensors are activated whereby multiple control signals can be transmitted during the various stages of burning of the rocket motor to effect actuation of desired control functions.

In FIG. 7 a simple circuit which can be employed in combination with a thermocouple is illustrated. The thermocouple is connected in series with a switch and current amplifier. The switch is generally closed prior to firing or can be closed in flight to activate the control system. During burning of the propellant in the rocket motor, the flame front reaches the thermocouple. A current is generated in the thermocouple as a result of heating, which current is transmitted through the lead wires to the amplifier. The amplifier strengthens the current which current in turn passes to the control system energizing operation of said system.

In FIG. 8 a simple circuit using a thermistor is shown. The thermistor is connected in series with a switch and a conventional transistorized bridge wire circuit. When the flame front from the burning propellant reaches the thermistor, current flow through the thermistor increases to upset the balance in the bridge circuit so that the bridge circuit activates the thrust control system. Sensing elements which can be employed in this invention include any device which is capable of generating an electrical impulse in response to heat such as thermocouples. Particularly suitable sensing elements are those which modify an electrical impulse in response to heat, such as thermistors. The probe employed with the sensing element must be chosen and designed for the particular sensing element employed as is clearly illustrated in FIGS. 1 and 2.

The circuits heretofore briefly described are illustrative of simple types of circuits which can be employed to operate a particular control device. It is to be understood that the actual circuit or control device employed does not constitute the present invention per se, but is merely a part of the invention when in combination with the other elements in the system heretofore described.

Illustrative control devices which can be activated by the control system of this invention include liquid quench systems to effect thrust termination as represented in FIG. 2 by liquid injector nozzle 15; nozzle deflectors and control systems to alter the flight trajectory of the rocket; and flexible linear shaped charges, explosive bolts, explosive valves and electrical blasting caps which are principally employed to open thrust termination or thrust reversal ports, or to destruct the rocket, or to activate a warhead.

In the control system of this invention single or multiple burning distance probe sensors can be employed with requisite associate circuitry to control one or more events. When the system is employed, for example, to permit control of the rocket motor at successive increments of delivered thrust, two or more sensors will be employed which can be connected in parallel or connected in separate circuits.

The burn distance sensor probes as well as any other part of the control system of this invention that is in contact with propellant must be compatible with the propellant. Thermistors should be coated with a thin, fusible synthetic electrical insulating resin such as polyvinyl acetal or epoxy resins. Optionally, but preferably, thermocouple wires are coated with a resin of the above type.

What I claim and desire to protect by Letters Patent is:

1. A control system for a solid propellant powered rocket motor, comprising:
    at least one burning distance probe thermocouple positioned in the rocket motor and surrounded by propellant to generate an electrical impulse in response to heat generated by burning propellant of the rocket motor;
    control means to alter the rocket motor performance in response to an electrical impulse; and,
    circuit means interconnecting said thermocouple and said control means to transmit said electrical impulse and activate said control means.

2. A control system as in claim 1 wherein said thermocouple is adjustably mounted with respect to said propellant so as to be preset at desired depths within said propellant.

3. A control system as in claim 2 wherein said control means is a liquid quench system.

4. A control system for a solid propellant powered rocket motor, comprising:
    at least one burning distance probe thermistor positioned in the rocket motor and surrounded by propellant to generate an electrical impulse in response to heat generated by burning propellant of the rocket motor;
    control means to alter the rocket motor performance in response to an electrical impulse; and,
    circuit means interconnecting said thermistor and said control means to transmit said electrical impulse and activate said control means.

5. A control system as in claim 4 wherein said thermistor is adjustably mounted within respect to said propellant so as to be preset at desired depths within said propellant.

6. A control system as in claim 5 wherein said control means is a liquid quench system.

* * * * *